United States Patent [19]

Schmalz

[11] Patent Number: 4,896,532

[45] Date of Patent: Jan. 30, 1990

[54] METHOD OF DETECTING TURBULENCE IN LAMINAR AIR FLOW

[75] Inventor: Henry H. Schmalz, Rockford, Ill.

[73] Assignee: Thermal Surveys, Inc., Rockford, Ill.

[21] Appl. No.: 269,195

[22] Filed: Nov. 9, 1988

[51] Int. Cl.$^4$ .................................................. G01M 9/00
[52] U.S. Cl. ...................................... 73/147; 250/356.1
[58] Field of Search ............... 73/147; 250/356.1, 340; 374/4, 5, 54

[56] References Cited

U.S. PATENT DOCUMENTS

| | | | |
|---|---|---|---|
| 1,676,984 | 7/1928 | Fales et al. | 73/147 |
| 2,134,890 | 11/1938 | Redon | 73/147 |
| 2,952,776 | 9/1960 | Schumacher et al. | 73/147 |
| 3,566,669 | 3/1971 | Lawrence et al. | 374/5 |
| 3,628,953 | 12/1971 | Brieckman | 96/36.3 |
| 3,780,293 | 12/1973 | Flint | 250/339 |
| 3,869,909 | 3/1975 | Hale et al. | 73/147 |
| 3,935,460 | 1/1976 | Flint | 250/349 |
| 3,977,244 | 8/1976 | Stone | 73/147 |
| 4,031,759 | 6/1977 | Jones | 73/432 R |
| 4,188,823 | 2/1980 | Hood | 73/147 |
| 4,266,130 | 5/1981 | Kuhn | 250/339 |
| 4,304,124 | 12/1981 | Biblars | 73/147 |
| 4,493,211 | 1/1985 | Weinstein | 73/147 |
| 4,590,374 | 5/1986 | Brewster | 250/338 |
| 4,646,564 | 3/1987 | Ide et al. | 73/147 |
| 4,725,733 | 2/1988 | Hormann et al. | 250/339 |

OTHER PUBLICATIONS

"Use of Infrared Absorbing Gas in Illustrating Diffuser Air Flow Patterns", pp. 153 to 156, SPIE, vol. 313, Thermosense IV (1981).

Primary Examiner—Donald O. Woodiel
Attorney, Agent, or Firm—Leydig, Voit & Mayer, Ltd.

[57] ABSTRACT

A laminar air flow is directed through a space and becomes turbulent upon encountering objects in the space. In order to enable the turbulence in the air flow to be visualized, laminar streams of a tracer gas are introduced into the laminar air flow in the same direction and approximately at the same velocity as the laminar air flow. The tracer gas is a gas such as nitrous oxide having a vibrational absorption frequency in the infrared range. A warm background is positioned at one side of the tracer gas streams and a filter-equipped infrared camera is positioned at the opposite side of the streams and is directed toward the warm background. The camera detects the flow pattern of the tracer gas and produces a permanent photographic image of such pattern.

11 Claims, 2 Drawing Sheets

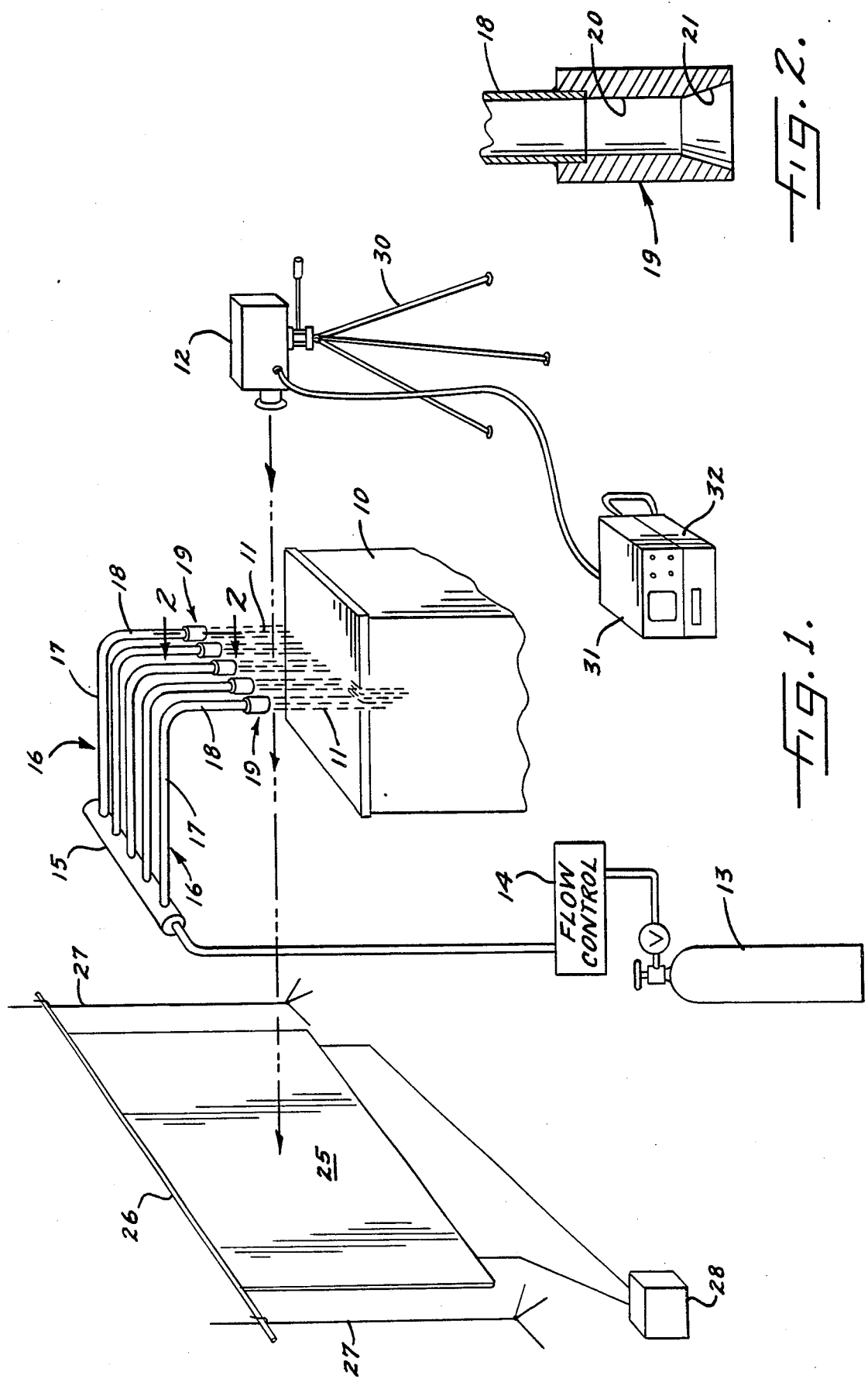

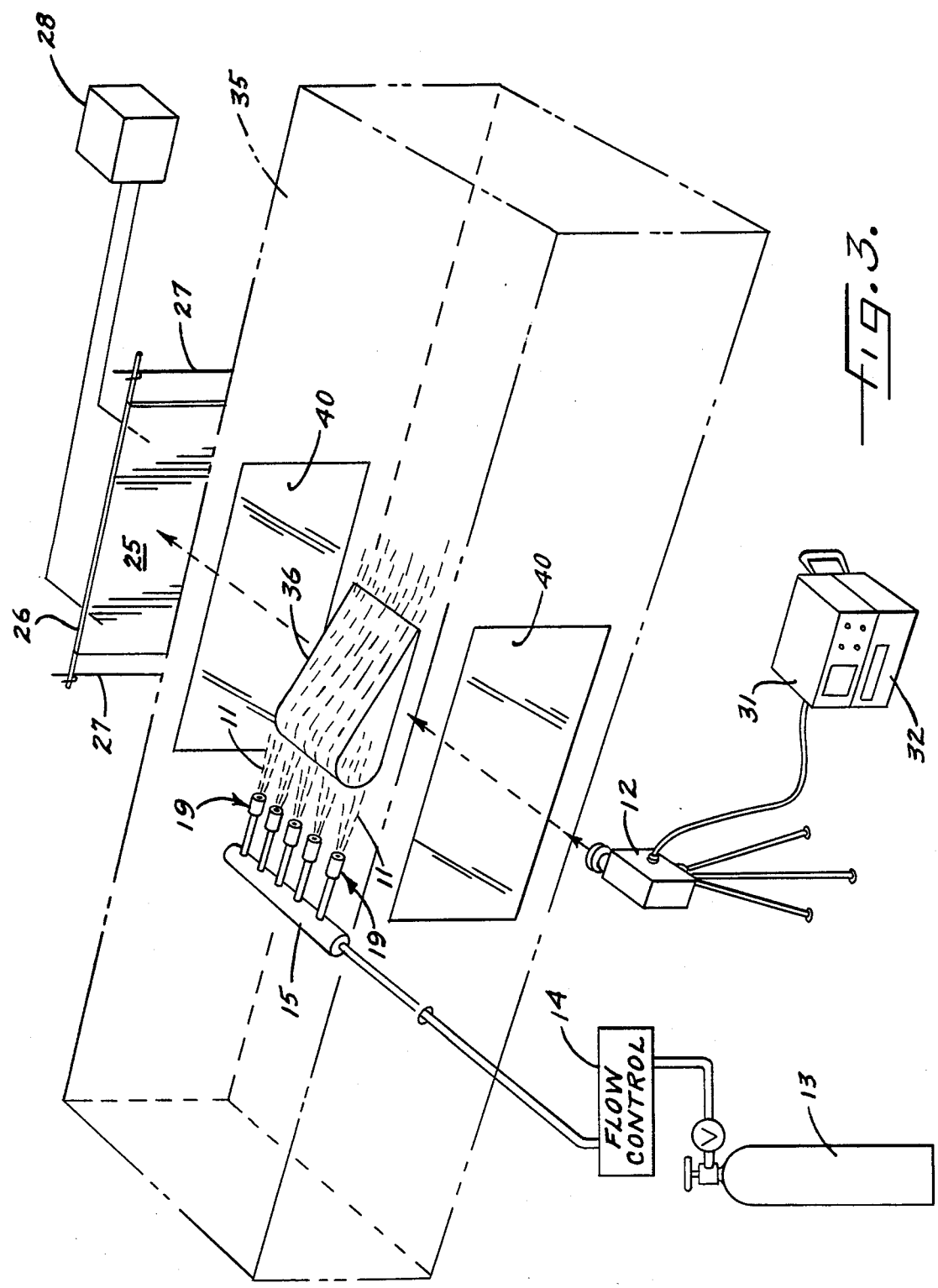

METHOD OF DETECTING TURBULENCE IN LAMINAR AIR FLOW

BACKGROUND OF THE INVENTION

This invention relates generally to a method of detecting turbulence in laminar air flow. While the invention will find many applications, it is particularly useful in detecting turbulence in a clean room in which a vertical or horizontal laminar flow of air is introduced into the room in order to sweep contaminating particles from the room.

Present day contamination standards in clean rooms are highly exacting and, in some instances, it is necessary that each cubic foot of air in the room contain less than ten contamination particles of a size of one micron or less. In order to meet such standards, it is essential to keep the flow of air through the room in the most nearly achievable laminar state. Turbulence in the stream creates vortexes which entrap particles and cause them to contaminate the work or process in the room.

Unless the room is completely empty, it is virtually impossible to establish a truly laminar flow of air through the room. Any physical objects in the room cause turbulence in the air stream as the air flows past such objects. It is, therefore, highly desirable to design and position such objects so that they produce the least possible turbulence and thus cause the air stream to entrap the fewest possible particles.

SUMMARY OF THE INVENTION

The general aim of the present invention is to provide a new and improved method of visually detecting and recording the pattern of turbulence in laminar air flow so that the recording can be used as a diagnostic aid in reducing the turbulence.

A more detailed object of the invention is to achieve the foregoing by introducing laminar jets of a tracer gas into the flow of ambient air and by using an infrared camera to detect and record the flow pattern of the tracer gas.

The invention also resides in injecting pulses of tracer gas into the ambient air stream and in using the tracer gas and the camera to measure and record the velocity of the ambient stream.

These and other objects and advantages of the invention will become more apparent from the following detailed description when taken in conjunction with the accompanying drawings.

BRIEF DESCRIPTION OF THE DRAWINGS

FIG. 1 is a schematic perspective view of one embodiment of a new and improved system incorporating the unique features of the present invention.

FIG. 2 is an enlarged fragmentary cross-section taken substantially along the line 2—2 of FIG. 1.

FIG. 3 is a view similar to FIG. 1 but shows another system utilizing the principles of the invention.

DETAILED DESCRIPTION OF THE PREFERRED EMBODIMENTS

In FIG. 1, the invention has been shown as being used in conjunction with a so-called clean room. Some typical uses of clean rooms are surgical operating rooms; manufacturing facilities for pharmaceuticals, solid state microelectronics, precision aerospace components and photographic materials; and microbiology and genetic engineering laboratories.

In a clean room, a laminar flow of air or other gas is established through the room in order to sweep contaminants from the room. Although the laminar flow could stream horizontally through the room, the flow most usually is introduced from the ceiling of the room through highly efficient particle filters and is kept as laminar as possible while flowing downwardly and before being exhausted through the floor or through baseboard outlets. The velocity of the flow is typically about ninety feet per minute. When the flow encounters an object such as a work bench 10 in the room, the flow is deflected and becomes turbulent. The turbulent flow creates vortexes which tend to entrap particles and prevent the particles from being exhausted from the room. It is, therefore, important that the room and the various objects therein be designed and located so as to create as little turbulence as possible in critical areas.

The present invention contemplates a new and improved method which enables turbulence in a laminar air flow to be detected and visually recorded. By virtue of having a visual recording of turbulence, a contamination control engineer can design and position various objects in such a manner as to reduce turbulence and thereby improve the efficiency of particle removal.

In general, the foregoing is achieved by introducing at least one laminar stream 11 of a tracer gas into the laminar air flow, by using an infrared camera 12 to take photographic images of the flow pattern of the tracer gas, and by using the output of the camera to produce permanent visual images. Having a visual image of the existing turbulence, the contamination control engineer can then attempt to redesign or relocate objects in the clean room in an effort to reduce the turbulence.

More specifically, the tracer gas which is used herein is a gas having a vibrational absorption frequency in the short infrared range of 2.0 to 5.6 microns. The tracer gas preferably should also be non-toxic, non-flammable and antiseptic. The preferred tracer gas is nitrous oxide ($N_2O$) although gases such as carbon dioxide ($CO_2$), argon (A), and helium (He) can be used in certain applications.

In carrying out the invention, laminar streams 11 of nitrous oxide or other suitable tracer gas are introduced into the laminar flow of ambient air in the same direction as the laminar flow and at a velocity substantially equal to that of the laminar flow. As shown in FIG. 1, the tracer gas may be contained under pressure in a tank 13 and discharged from the tank at a predetermined rate determined by the setting of an adjustable flow control 14. Tracer gas from the tank flows to a horizontal manifold 15 where the flow preferably is divided into a plurality (herein, five) of discrete and parallel streams although a single laminar stream will suffice in some instances. For this purpose, five pipes 16 are spaced along the manifold and each includes a horizontal section 17 and a downwardly extending vertical section 18. Secured to the lower end of each vertical section is a nozzle 19 which causes the tracer gas to discharge into the clean room as a laminar stream 11. A preferred nozzle is shown in FIG. 2 and includes a cylindrical bore 20 which leads to a downwardly flaring discharge bore 21. The nozzles 19 may be located above the workbench 10 or other object in the clean room and serve to direct five parallel and laminar streams 11 of tracer gas downwardly against the object.

In order to enable the nitrous oxide streams 11 to be detected and photographed by the infrared camera 12, a thermally uniform background 25 is positioned behind the streams, the temperature of the background being greater than that of the ambient air flowing through the room so that heat energy may be absorbed from the background by the camera. The preferred background comprises a uniform layer of filamentary carbon embedded in Teflon and sandwiched between two panels of polyester film. One panel of the film forms the forward or active face of the background 25 while the outer side of the other panel of film is thermally insulated with polyester foam and aluminum foil in order to increase the temperature of the active film with minimum interference to the ambient air in the clean room. One suitable background is that designated as "THERMOFILM" and sold by Thermofilm Corp., Concord, Ontario, Canada.

The background 25 is supported in a vertical plane by a winding rod 26 which spans two supporting stands 27. A source 28 of electrical power is connected to the background and serves to heat the active face of the background to a temperature of between 100 and 115 degrees F. when nitrous oxide is used as the tracer gas.

The infrared camera 12 is supported on a tripod 30 in such a position that the lens of the camera points toward the warm background 25 with the nitrous oxide streams 11 being located between the camera and the background. A suitable camera forms part of an infrared scanning system designated as an "AGEMA THERMOVISION 870" system. Such a camera does not require cryogenic liquid or gas cooling.

The camera 12 is capable of operating in an infrared spectra having wavelengths ranging from about 2.0 microns to 5.6 microns. Importantly, the camera is fitted with a band pass filter which reduces the sensing range to a narrow frequency band that substantially matches the vibrational frequency of the tracer gas. When the tracer gas is nitrous oxide, the filter which is used narrows the sensing range of the camera to a range of about 4,540 nanometers to approximately 4,580 nanometers. This is the range in which the nitrous oxide gas absorbs about ninety percent or more of the transmitted energy from the warm background 25.

Connected to the output of the camera 12 are an infrared camera display 31 (i.e., a cathode ray tube) and a video cassette recorder 32. The CRT displays the instantaneous output of the camera while the VCR makes a permanent recording of the output. It should be realized, however, that the VCR can be replaced by a still camera for making still negatives from the output of the camera 12.

With the foregoing arrangement, the background 25 provides a source of heat enabling the infrared camera 12 to detect the absorbed vibrational energy from the tracer gas and thereby detect the tracer gas streams 11 and the flow pattern thereof. The output of the camera produces an image which shows the tracer gas streams as black smoke or streamers on a bright background. Since the streamers are indicative of turbulence in the laminar air flow, the contamination control engineer can determine the location of problem areas in the clean room and can attempt to reduce the turbulence in those areas.

The system as described above also can be used to detect and measure the velocity of the laminar air flow. This can be accomplished by using a background 25 whose active face includes a series of horizontally extending and vertically spaced lines. The tracer gas is pulsed intermittently through the nozzles 19 in short bursts and the ultimate recording will indicate the real time required for the gas to pass through a known vertical distance extending between two of the horizontal lines.

While the preferred application of the system of the invention is in a clean room as described above, the system will find various other advantageous uses. For example, the system may be used for inspecting for leaks in high efficiency particulate air filters and in the duct work used to supply air to a clean room. A still different application is shown in FIG. 3 in which the components that are the same as those of FIG. 1 are identified by the same reference numerals. The system of FIG. 3 is used in an air tunnel 35 having an object 36 therein. A horizontal laminar air flow is directed from left to right through the tunnel and is accompanied by laminar streams 11 of tracer gas emitted from horizontal nozzles 19. The camera 12 and the warm background 25 are placed in alinement with one another on opposite sides of the wind tunnel 35 and are positioned adjacent transparent and radiation-transmitting windows 40 in the sides of the tunnel.

It is contemplated that the nitrous oxide may be chilled to about zero degrees F. and emitted from the nozzles 19 in vapor form. In such an instance, the tracer gas may be detected by virtue of thermal absorption as well as by visual inspection in the infrared range. Also, it should be appreciated that gases such as sulfur hexafluoride ($SF_6$) or clorinated fluorocarbons (CFS's) can be used as a tracer gas in connection with a camera having a detector element for use in the long infrared range of 8.0 to 14.0 microns and having an appropriate filter.

I claim:

1. A method of visualizing turbulence in laminar air flow, the method comprising the steps of, creating a laminar stream of a first gas flowing at a predetermined velocity, creating a laminar stream of a predetermined tracer gas flowing within and in the same direction as the stream of the first gas and at a velocity substantially equal to the velocity of the first gas, the tracer gas having a vibrational absorption frequency in the infrared range, providing a thermally uniform background on one side of said streams, placing a camera on the opposite side of said streams with the camera directed toward said background, said camera being operable to detect radiation in the infrared range and to provide an output in the visual range, said camera being equipped with a band pass filter capable of transmitting infrared radiation to a narrow frequency band that substantially matches the vibrational frequency of the tracer gas, and taking photographic images of said streams with said camera.

2. A method as defined in claim 1 in which multiple parallel streams of tracer gas are created and flow in the same direction and at substantially the same velocity as said first gas.

3. A method as defined in claim 1 in which said stream of first gas and said stream of tracer gas flow substantially vertically.

4. A method as defined in claim 1 in which said stream of first gas and said stream of tracer gas flow substantially horizontally.

5. A method as defined in claim 1 in which said tracer gas is chilled to a temperature substantially lower than the temperature of said first gas.

6. A method as defined in claim 1 in which said background has a series of parallel lines, said stream of tracer gas being injected intermittently into said first gas.

7. A method as defined in claim 1 in which said tracer gas is selected from the group consisting essentially of nitrous oxide, carbon dioxide, argon, helium, sulfur hexafluoride and one of a number of clorinated fluorocarbons.

8. A method as defined in claim 1 in which said tracer gas is nitrous oxide.

9. A method as defined in claim 8 in which said camera is an infrared camera having a sensing range of from about 2.0 microns to 5.6 microns, said filter narrowing the sensing range of said camera to a range of from approximately 4.54 microns to approximately 4.58 microns.

10. A method as defined in claim 8 in which the temperature of said background is higher than the temperature of said first gas.

11. A method of visualizing turbulence in a clean room having a laminar stream of ambient gas flowing vertically through the room at a predetermined velocity, said method comprising the steps of, injecting multiple and parallel laminar streams of a predetermined tracer gas within and in the same direction as the stream of ambient gas and at a velocity substantially equal to the velocity of the ambient gas, the tracer gas having a vibrational absorption frequency in the infrared range, providing a thermally uniform background on one side of said streams, the temperature of the background being higher than the temperature of the ambient gas, placing a camera on the opposite side of said streams with the camera directed toward said background, said camera being operable to detect radiation in the infrared range and to provide an output in the visual range, said camera being equipped with a band pass filter capable of transmitting infrared radiation to a narrow frequency band that substantially matches the vibrational frequency of the tracer gas, and taking photographic images of said tracer gas streams with said camera.

* * * * *